United States Patent
Goebel et al.

(10) Patent No.: US 7,548,830 B2
(45) Date of Patent: Jun. 16, 2009

(54) SYSTEM AND METHOD FOR EQUIPMENT REMAINING LIFE ESTIMATION

(75) Inventors: Kai Frank Goebel, Mountain View, CA (US); Piero Patrone Bonissone, Schenectady, NY (US); Weizhong Yan, Clifton Park, NY (US); Neil Holger White Eklund, Schnectady, NY (US); Feng Xue, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 77 days.

(21) Appl. No.: 11/678,273

(22) Filed: Feb. 23, 2007

(65) Prior Publication Data

US 2008/0208487 A1      Aug. 28, 2008

(51) Int. Cl.
*G06F 17/18* (2006.01)
(52) U.S. Cl. ..................................... 702/181
(58) Field of Classification Search .................. 702/181, 702/136; 701/100; 700/30, 31; 436/71; 600/323

See application file for complete search history.

(56) References Cited

U.S. PATENT DOCUMENTS

| | | | | |
|---|---|---|---|---|
| 5,408,405 A | * | 4/1995 | Mozumder et al. | 700/31 |
| 7,243,042 B2 | * | 7/2007 | Plotts et al. | 702/136 |
| 2005/0131283 A1 | * | 6/2005 | Grant et al. | 600/323 |
| 2006/0047403 A1 | * | 3/2006 | Volponi et al. | 701/100 |
| 2007/0135938 A1 | * | 6/2007 | Subbu et al. | 700/30 |
| 2008/0057590 A1 | * | 3/2008 | Urdea et al. | 436/71 |

OTHER PUBLICATIONS

Goebel, Kai et al; "Fusing Competing Prediction Algorithms for Prognostics" ; IEEEAC paper #593 Version 3 (2006) p. 1-10.
Goebel, Kai et al; "Prognostic Fusion for Uncertainty Reduction"; AIAA (2007) p. 1-10.
U.S. Appl. No. 11/359,339. "Method, System, and Computer Program Product for Performing Prognosis and Asset Management Services"; Filed Feb. 22, 2006: Inventor(s) Pierino Gianni Bonanni, et al by General Electric Company.

* cited by examiner

Primary Examiner—Tung S Lau
Assistant Examiner—Xiuquin Sun
(74) Attorney, Agent, or Firm—Penny A. Clarke (57) ABSTRACT

A method to reduce uncertainty bounds of predicting a remaining life of a probe using a set of diverse models is disclosed. The method includes generating an estimated remaining life output by each model of the set of diverse models, aggregating each of the respective estimated remaining life outputs via a fusion model, and in response to the aggregating, predicting the remaining life, the predicting having reduced uncertainty bounds based on the aggregating. The method further includes generating a signal corresponding to the predicted remaining life of the probe.

22 Claims, 10 Drawing Sheets

SYSTEM AND METHOD FOR EQUIPMENT REMAINING LIFE ESTIMATION

BACKGROUND OF THE INVENTION

The present disclosure relates generally to the field of prognostics, and particularly to a system and method for estimating remaining useful equipment life.

Estimating a remaining life of equipment is known in the art as prognostics. Remaining useful life (RUL) estimates provide valuable information for operation of modern complex equipment. RUL estimates provide decision malting aids that allow operators to change operational characteristics (such as load) which, in turn, may prolong a life of the equipment. RUL estimates also allow planners to account for upcoming maintenance and set in motion a logistics process that supports a smooth transition from faulted to fully functioning equipment. Estimating RUL is not straightforward because, ordinarily, RUL is conditional on future usage conditions, such as load and speed, for example. Examples of equipment that may benefit from the use of RUL estimates are aircraft engines (both military and commercial), medical equipment, and power plants, for example.

The utility of RUL estimates is in inverse proportion to an amount of associated uncertainty. That is, if an estimate has large confidence bounds, the utility of such an estimate becomes small because an operator would have to make decisions to repair components at an otherwise acceptable level of risk.

Several fundamentally different approaches may be employed to estimate RUL. One is to model from first principles the physics of a system as well as a fault propagation for given load and speed conditions. Such a physics-based model must include detailed knowledge of material properties, thermodynamic behavior, etc.

Alternatively, an empirical (also referred to as experience-based) model can be employed wherein data from experiments at known conditions and component damage levels are used to build a model for a fault propagation rate. Such a model relies heavily on performing a reasonably large set of experiments that sufficiently explores the operating space.

The two approaches mentioned for estimating RUL have various advantages and disadvantages. The physics-based model relies on an assumption that a fault mode modeled using a specific geometry, material properties, temperature, load, and speed conditions will be similar to an actual fault mode. Deviation in any of those parameters will likely result in an error that is amplified over time. In contrast, the experience-based model assumes that the data available sufficiently maps the space and that interpolations (and small extrapolations) from that map can accurately estimate the fault rate. As a consequence, the two approaches will likely arrive at different estimates. In addition, their respective uncertainty bounds are different as well.

What is needed, therefore, is a way to provide real-time (or near real-time) information concerning equipment RUL that resolves the differences of the different approaches, resulting in a more accurate and reliable estimate than individual existing processes alone.

BRIEF DESCRIPTION OF THE INVENTION

An embodiment of the invention includes a method to reduce uncertainty bounds of predicting a remaining life of a probe using a set of diverse models. The method includes generating an estimated remaining life output by each model of the set of diverse models, aggregating each of the respective estimated remaining life outputs via a fusion model, and in response to the aggregating, predicting the remaining life, the predicting having reduced uncertainty bounds based on the aggregating. The method further includes generating a signal corresponding to the predicted remaining life of the probe.

Another embodiment of the invention includes a system to estimate a remaining life of a probe using a set of diverse models. The system includes a processor and a computational model application for executing on the processor. The computational model application performs a method including generating an estimated remaining life output by each model of the set of diverse models, aggregating each of the respective estimated remaining life outputs via a fusion model, and in response to the aggregating, predicting the remaining life, the predicting having reduced uncertainty bounds based on the aggregating. The processor is responsive to the computational model application to generate a signal corresponding to the predicted remaining life of the probe.

BRIEF DESCRIPTION OF THE DRAWINGS

Referring to the exemplary drawings wherein like elements are numbered alike in the accompanying Figures.

DETAILED DESCRIPTION OF THE INVENTION

A reasoner is an algorithm that attempts to analyze a variety of independent information sources toward achieving a particular goal. In the case of complex equipment, for example, one goal of a reasoner is to provide a remaining life prediction. To that end, the reasoner negotiates and aggregates data from independent information sources while talking the inherent uncertainties of the independent information sources into account. The uncertainty may vary as a function of time, reliability of the information sources, and domain knowledge, among others. There are a number of issues that need to be dealt with prior to an actual aggregation. Specifically, the information needs to be checked for consistency, and it needs to be cleaned of outliers, noise, and faulty or otherwise bad sensor information. It should also be conditioned and formatted to allow a proper comparison. These, and other considerations, must be taken into account by the reasoner. A key contribution of the reasoner is to assess the uncertainties of individual estimators and to aggregate them such that the uncertainty bounds of the resulting output are smaller than the uncertainty bounds of any of the individual information sources alone. Moreover, it is desirable that the output of the reasoner is more accurate than any individual information source alone.

An embodiment of the invention will provide a remaining useful life (RUL) prediction having reduced uncertainty bounds. In an embodiment, uncertainty bounds are reduced by a fusion of more than one RUL estimation model that can be either a physics-based model of damage propagation or a data-driven, empirical experience-based model, or both. The fusion combines results of different, or diverse models tools to provide a RUL prediction that is better than the best result possible by any one model employed. As used herein, the term "diverse models" shall refer to the use of more than one estimation model, each exhibiting different estimation errors for different ranges of input conditions, as will be described further below. The diverse models also provide redundant information, which when combined correctly, improves the estimate of the most accurate model and compensates for shortcomings of the models having less accuracy. An embodiment of the invention establishes weights, function coefficients or rules, for example, that are used to scale an uncertainty of each estimation model, and aggregates the output of the more than one diverse models based upon the weights.

As used herein, the term "prognostics" shall refer to an estimation of a remaining useful life of equipment. The RUL estimate is in units of time or cycles of operation (such as startup, flight, and shutdown of an aircraft engine), for example. The RUL estimate typically has associated uncertainty that is described as a probability density curve. Operators can choose a confidence level that allows them to incorporate a risk level into their decision making. Often, a confidence interval on RUL estimates decreases as a prediction horizon decreases, such as near an end of component life, for example.

Prognostics is closely linked to diagnostics. As used herein, the term "diagnostics" shall refer to a detection of a fault condition, or an observed change in an operational state that is related to an abnormal event. A fault is a first sign of a potential end of equipment useful life at some future time. An example of such a fault is a distressed turbine section that leads to an increase in engine fuel consumption. In most applications, a direct cost of the end of equipment useful life is unavoidable: ultimately, the equipment must be replaced. Moreover, there are indirect costs to the end of equipment useful life that are in many cases far greater than the direct cost of the repair. One source of indirect costs is secondary damage, for example, an end of the useful life of a component in a compressor stage of a gas turbine often causes damage to rear stages of the gas turbine. Another indirect cost is unscheduled maintenance. It is often less expensive to replace a faulty component during scheduled maintenance before it has reached the end of its useful life than to have a component reach the end of its useful life in the field which may result in operational disruption and unscheduled maintenance.

Figure 1:
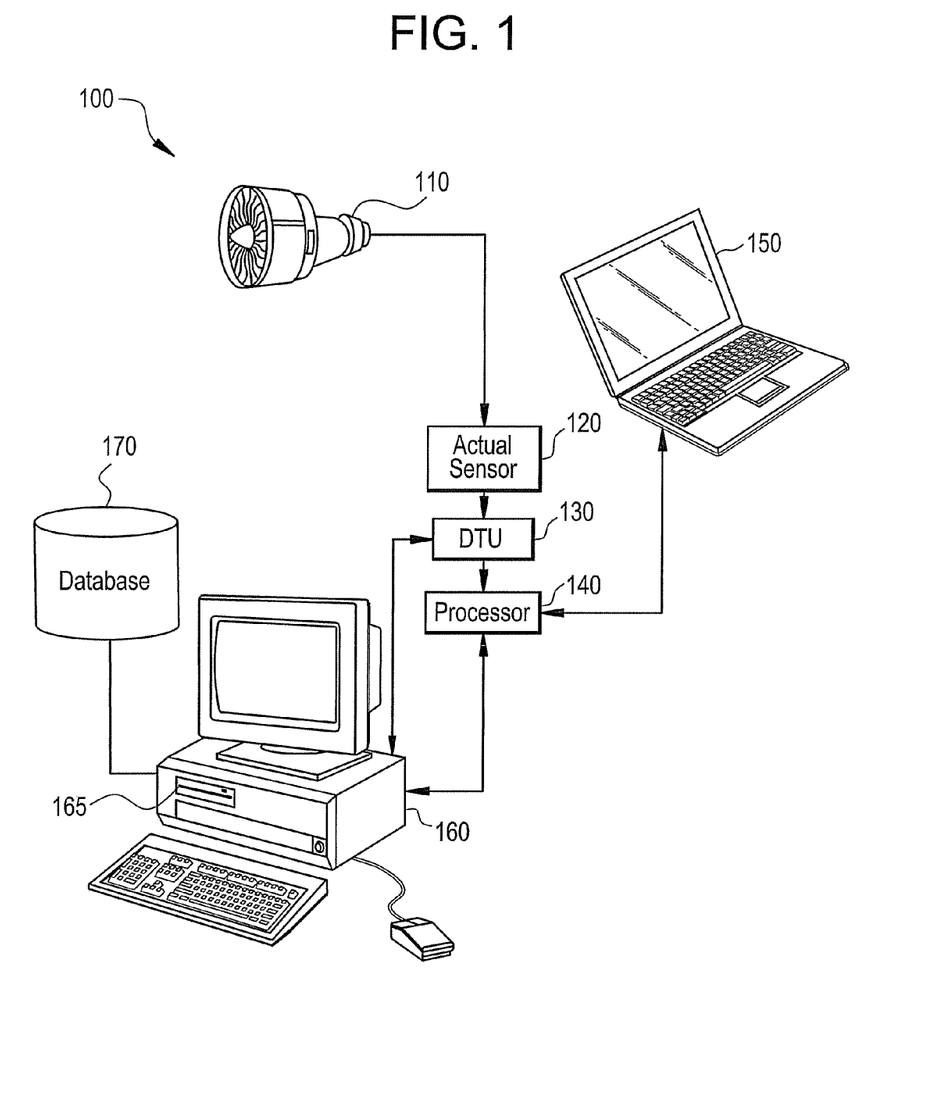
FIG. 1 depicts a schematic diagram of a system for generating a RUL prediction in accordance with an embodiment of the invention.

Referring now to FIG. 1, a schematic diagram of an embodiment of a system 100 for generating a RUL prediction is depicted. In an embodiment, the system 100 includes at least one turbine engine 110, at least one actual sensor 120, a data transfer unit (DTU) 130, a processor 140, an interface unit 150, a computer 160, and a database 170. The computer 160 further includes a program storage device 165.

While an embodiment of the system has been described having at least one turbine engine, it will be appreciated that the scope of the invention is not so limited, and that the invention will also apply to systems 100 including other pieces of equipment, such as locomotive engines, power generators, medical equipment, and rolling mills, for example.

In an embodiment, the at least one sensor 120 is disposed and configured to be responsive to an operating condition of the engine 110, and to generate a signal representative of the operating condition of the engine 110. In an embodiment, the at least one sensor 120 is in signal communication with the data transfer unit 130, which makes available to the processor 140 the signal representative of the operating condition of the engine 110.

In an embodiment, the processor 140 is in signal communication with an interface device 150. In an embodiment, the processor 140 is also in signal communication with the computer 160. In an embodiment, the computer 160 is in signal communication with the database 170. The computer 160 is configured to make available to the database 170, via the processor 140, historical data relating to the operating conditions of the engine 110. In an embodiment, the database 170 is further configured to store and make available to the computer 160 the historical data relating to the operating conditions of the at least one engine 110, including the signals generated by the at least one sensor 120. The computer 160 also includes the program storage device 165 configured to store, and make available to the computer 160 for execution, a computational application for fusing together independent estimates of the RUL of the engine 110. The processor 140 is responsive to the computational application to generate a signal corresponding to a fused, predicted remaining engine 110 life. It will be appreciated that the above is for illustration purposes only, and not for limitation of an embodiment of the invention.

While an embodiment of the invention has been described having a computer 160 in signal communication with the processor 140, it will be appreciated that the scope of the invention is not so limited, and that the invention will also apply to prediction systems that have the computer 160 in direct signal communication with the data transfer unit 130. It will be further appreciated that an embodiment of the invention will also include the computer in signal communication via the data transfer unit 130 via a variety of communication protocols, such as cellular, wireless Internet, and others, for example, to allow a connection between the computer and the data transfer unit.

Figure 2:
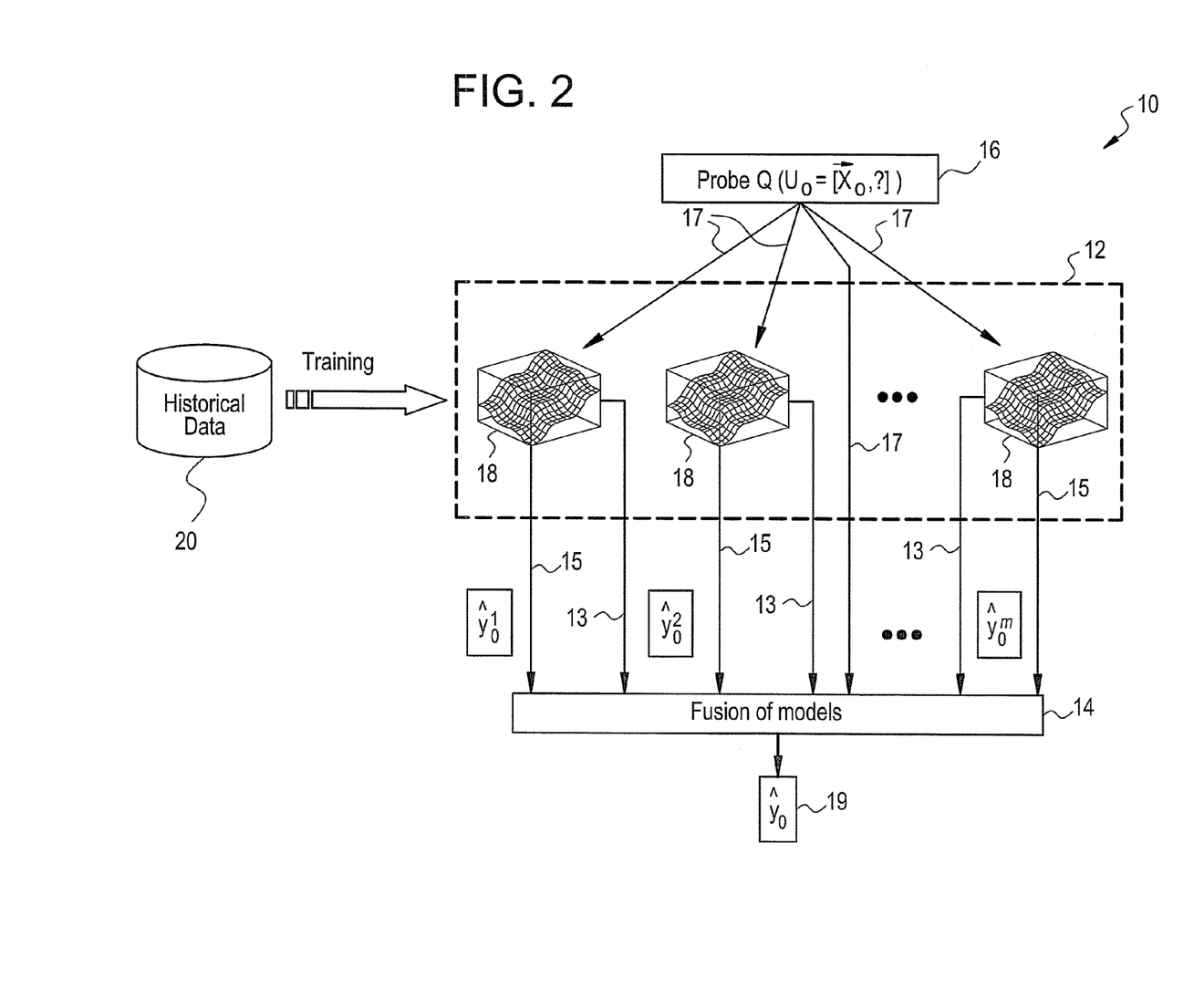
FIG. 2 depicts a schematic diagram of fusion of a set of models for generating a RUL prediction in accordance with an embodiment of the invention.

Referring now to FIG. 2, a schematic diagram of an embodiment of a system 10 for generating a RUL prediction using a committee (also herein referred to as a set) of models 12 and an output fusion model 14 is depicted. In the example illustrated in FIG. 2, the system 10 is utilized in connection with predicting a RUL relating to a piece of equipment of interest, known as a probe 16. As used herein, the term "model" generally refers to, but is not limited to referring to, a predictive module that can serve as a proxy for an underlying equipment performance representation, and the term "committee" refers to, but is not limited to referring to, a collection or set of models that are each capable of doing a similar, albeit not identical, estimation task. System 10 can, in one embodiment, be implemented within a general-purpose computer. Many different types of computers can be utilized, and an embodiment is not limited to practice on any one particular computer. The term "computer", as used herein, includes desktop and laptop type computers, servers, microprocessor based systems, application specific integrated circuits, and any programmable integrated circuit capable of performing the functions described herein in connection with the system 10.

As shown in FIG. 2, the committee of models 12 includes multiple predictive models 18. Each predictive model 18 generates a model output 15 for Probe Q 16 based on a model input 17. Examples of model input 17 include time series trajectories of sensor parameters and operational parameters (such as altitude, and airspeed, for example) over a time window from the present back to a specified period, such as a number of operational cycles, for example. The fusion model 14 receives the model input 17, the model outputs 15, and contextual, or state information 13 relating to each model 18, as will be described further below. The fusion model 14 uses the model input 17, model outputs 15, and state information 13 to fuse the model outputs 15, as described below in further detail. System 10 generates one fused output 19 based on such fusion. The fused output 19 is an enhanced RUL prediction of the probe 16 having reduced uncertainty bounds as compared to any one of the RUL estimates provided by the model outputs 15. The term "fuse", as used herein, refers to combining the model outputs 15 in a manner that results in generation of a modified output.

In one embodiment, each model 18 is a neural network based data-driven model 18 trained and validated using historical data 20 and constructed to represent input-output relationships. For example, for a turbine engine 110, there may be one committee of models 12 including more than one model 18, to each generate model outputs 15 representative of at least one subsystem of the turbine engine 110. Example model inputs 17 can include operating conditions, also known as flight envelope points, deterioration conditions to describe a wear level of the engine 110, and fault conditions, for example. The model outputs 15 can include expected engine 110 operating attributes, such as temperatures, speeds, and clearances, and RUL estimates, for example.

With respect to FIG. 2, the model inputs 17 supplied to each model 18 from probe 16 represent one or more of various inputs. The term "probe", as used herein, refers to any piece of equipment for which a RUL estimate is desired. Each model 18 generates as the model output 15 a quantitative RUL estimate based on the corresponding model input 17.

As explained above, a local performance of each model 18 of the committee 12 may vary and may not be uniformly consistent over an entire prediction space, or range of input conditions described by the model inputs 17. For example, in one particular set of input conditions, one model 18 may have superior performance relative to the other models 18. In another set of input conditions, however, a different model 18 may have superior performance and the performance of the one model 18 may be inferior. As described above, this condition of varying independent model 18 performances is known as diversity. The model outputs 18 of committee 12 therefore are, in one embodiment, locally weighted using a process described below in order to leverage the diversity, or localized information so that models 18 are complementary to each other, and reduce the uncertainty of the fused output 19 as compared to any one model output 15.

Figure 3:
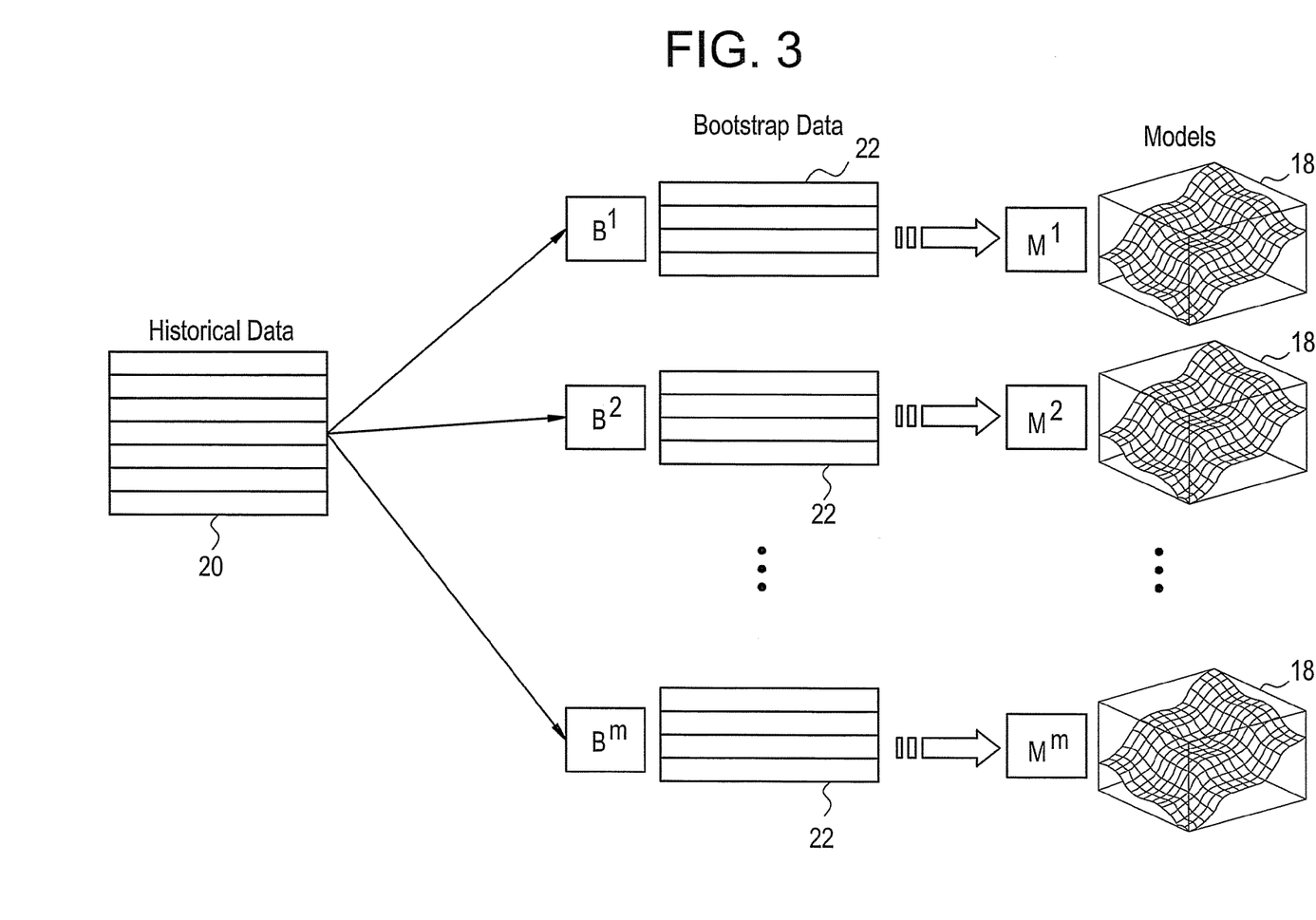
FIG. 3 depicts a schematic diagram of a data bootstrapping validation for training in accordance with an embodiment of the invention.

With respect to training multiple models 18, and referring to FIG. 3, each predictive model 18 is trained using historical data 20. Specifically, different but possibly overlapping sets 22 of historical data 20 are provided to each model 18, and such data is "bootstrapped" to train each model 18. That is, bootstrap validation is utilized in connection with training each model 18 based on historical data 20. More specifically, training data sets 22 are created by re-sampling with replacement from an original training set, so data records may occur more than once. Usually final estimates are obtained by taking an average of estimates from each bootstrap test data set 22.

For example, historical data 20 typically represent at least one known input variable and at least one known output variable. During training, the known output is compared with the model output 15, and if there is a difference between the model output 15 and the known output, the model 18 is then adjusted, so that the model 18 generates the known output. An example of adjusting the model 18 is to alter at least one of a node weighting and a connectivity for a neural network model.

Again, and as illustrated in FIG. 3, different but possibly overlapping sets 22 of historical data 20 are utilized in connection with such training. As a result, one model 18 may have particularly superior performance with respect to the variable conditions used in connection with training that model 18. For a different set of variable conditions, however, another model 18 may have superior performance.

Once models 18 are trained and the committee of models 12 is defined, the fusion model 14 for fusing the model outputs 15 is generated. Many different techniques can be utilized in connection with such fusion, and the present invention is not limited to any one particular fusion technique. Set forth below is one example fusion algorithm.

More particularly, and in an embodiment with respect to probe 16, the fusion model 14 includes retrieving historical data information relating to neighbors, or peers of the probe 16 within a prediction inputs space. As used herein, the term "peers" shall refer to equipment that exhibits behavior similar to that observed of the probe 16. The models 18 are executed, and provide as model outputs 15 more than one RUL estimate. The more than one RUL estimates are aggregated based on a local performance of the models 18. Compensation is then performed with respect to the local performance of each model 18. Compensation may also be performed with respect to a global performance of each model 18. The global performance may be computed by relaxing, or increasing a size of a neighborhood range of a prediction inputs space surrounding the probe 16. A fused output 19 is then generated.

Figure 4:
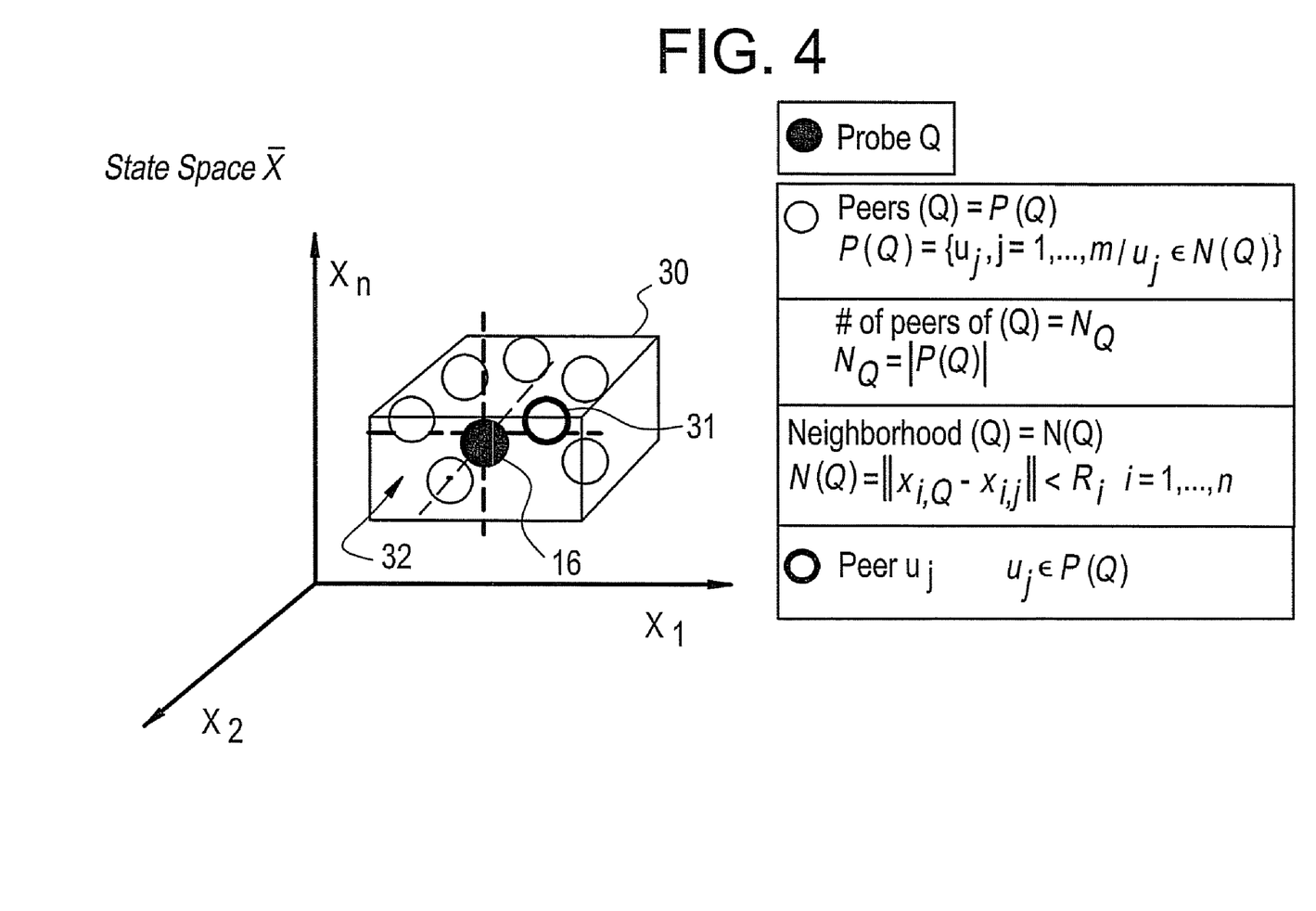
FIG. 4 depicts a schematic diagram of retrieval of peer equipment information in accordance with an embodiment of the invention.

FIG. 4 illustrates retrieval of peer historical data within a prediction inputs space 30. More specifically, probe 16 is represented by a solid circle within the prediction inputs space 30. Other circles represent peers 32 of the probe 16, or Peers (Q), where the number of peers 32 of the probe 16 is represented by NQ. A neighborhood, or size of the prediction inputs space 30 of the probe 16 is represented by N(Q). A given peer 31 $u_j$ is represented by a shaded circle with a thick solid outline.

Figure 5:
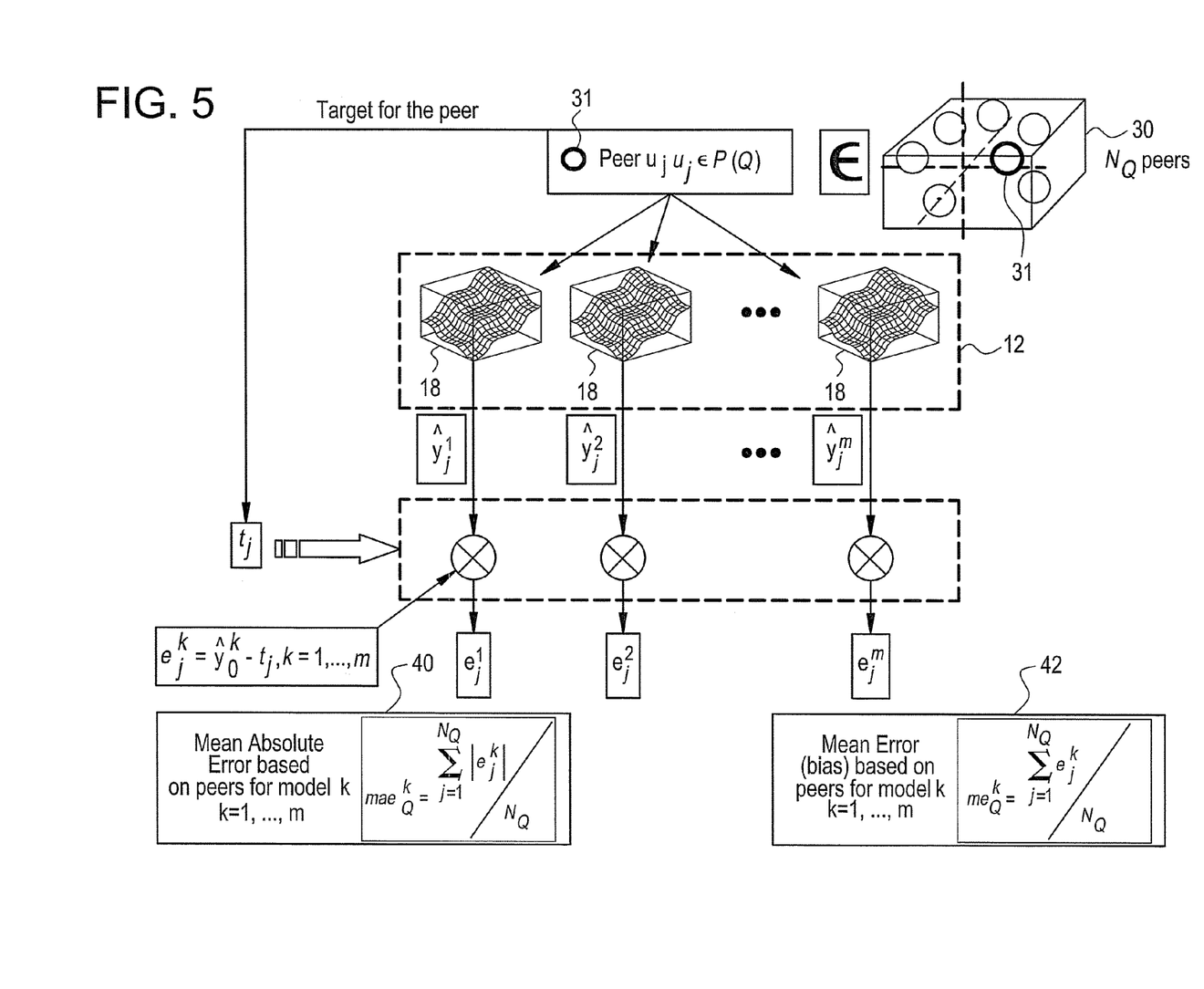
FIG. 5 depicts a schematic diagram of local model performance evaluation in accordance with an embodiment of the invention.

Once the historical data 20 relating to the peers 32 within the prediction inputs space 30 of the probe 16 are retrieved, the local performances of each model 18 for such peers 32 are evaluated, as shown in FIG. 5. Specifically, FIG. 5 illustrates evaluation of the local performance of predictive models 18. A mean absolute error 40 and a mean error (bias) 42 calculated over all peers 32 are determined for each model 18. The fusion model 14 is described as including a structure and parameters. In an embodiment, the structure can include at least one of a definition of regions that may be used to describe the feature space that relates to the local performance of each model 18, and operators used to fuse together a set of diverse model outputs 15, as described above. In an embodiment, the parameters can include at least one local weight to be applied to each model 18 based upon the local performance of the model 18, such as the mean absolute error 40 on peers 30 for that model, for example.

Figure 6:
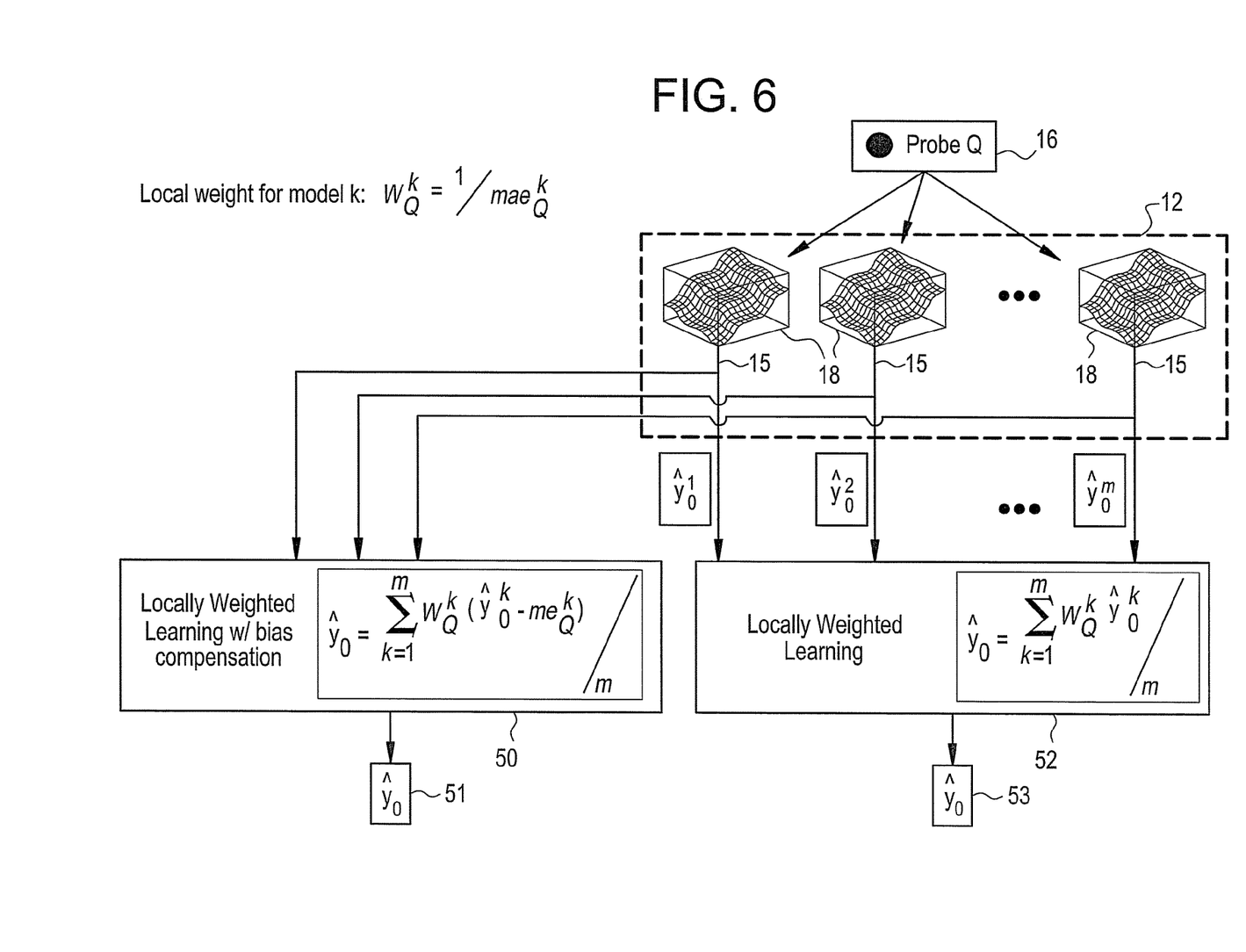
FIG. 6 depicts a schematic diagram of model aggregation in accordance with an embodiment of the invention.

FIG. 6 illustrates model 18 aggregation and bias compensation. Specifically, an output 15 from each model 18 is supplied to an algorithm for local weighting learning with bias compensation 50 and to an algorithm for local weighted learning with no bias compensation 52. If bias compensation is desired, then an output 51 from the algorithm with bias compensation 50 can be utilized. As explained above, the local weight for each model 18 is based on the mean absolute error 40 based on peers 32 for that model 18. If bias compensation is not desired, then an output 53 from the algorithm with no bias compensation 52 can be utilized.

In an embodiment, the fusion model 14, including the local weight for each model 18 is developed offline, or pre-computed, such that in response to at least one input condition describing a behavior of the probe 16, the fusion model 14 provides the fused output 19 using the pre-computed weight without a need to develop the local weight for each model 18. An advantage of such an approach is that it will provide a response within a shorter period of time as compared to the fusion model 14 that is developed online, or at runtime. As an illustrative example, it will be appreciated that after the detection of some types of faults, such as severe cracks in gas turbine blades for example, the equipment may have only a very short RUL. It will be appreciated that many schemes are available to be used by the fusion model 14 to select the local weight parameters to be applied to each model 18 for generating the fused output 19, and that use of a particular scheme may be a balance between accuracy and complexity.

Referring back now to FIG. 3, in one embodiment, a large granularity, or global, weighting selection will be used to evaluate a performance of each model 18 using all input conditions relating to the historical data 20, rather than data sets 22 relating to a portion, or region of the input conditions relating to the historical data 20. The global weighting selection provides a weight to be applied to an average evaluation of model 18 performance throughout an entire range of the historical data 20.

In another embodiment, random subsections, or partitions of the input conditions of the historical data 20 (also referred to as a feature space in each model 18), described by data sets 22 are used to develop local weights (also herein referred to as parameters of the fusion model 14) by training each model 18 with a different data set 22. As used herein, the term "feature space" shall refer to specific inputs used to train each model 18. For example, in an embodiment in which the model 18 estimates the RUL of an aircraft engine, features within the feature space can be, but are not limited to, altitude, speed, temperature, and pressure. The local weights are based upon properties of the historical data 20, and provide a smaller granularity to corresponding regions of input conditions of each model 18.

In an embodiment, pre-computing the appropriate local weight, as determined for various regions of the feature space that are described by the data set 22, allows the local weight to be stored for subsequent rapid recall. Therefore, as described above, the appropriate local weight, without needing to be determined at runtime, will be available based upon a known, real-time assessment of a region of the feature space, such as at least one of an altitude, speed, temperature, or pressure associated with operation of an aircraft engine, for example.

One embodiment will develop the local weights by a quantitative description using domain knowledge regarding the historical data 20 with mathematical expressions to determine the appropriate weights for different data sets 22. For purposes of illustration, and not limitation, the appropriate local weight can be determined by evaluating a mean of absolute prediction errors of all points with the region, as described above.

Figure 7:
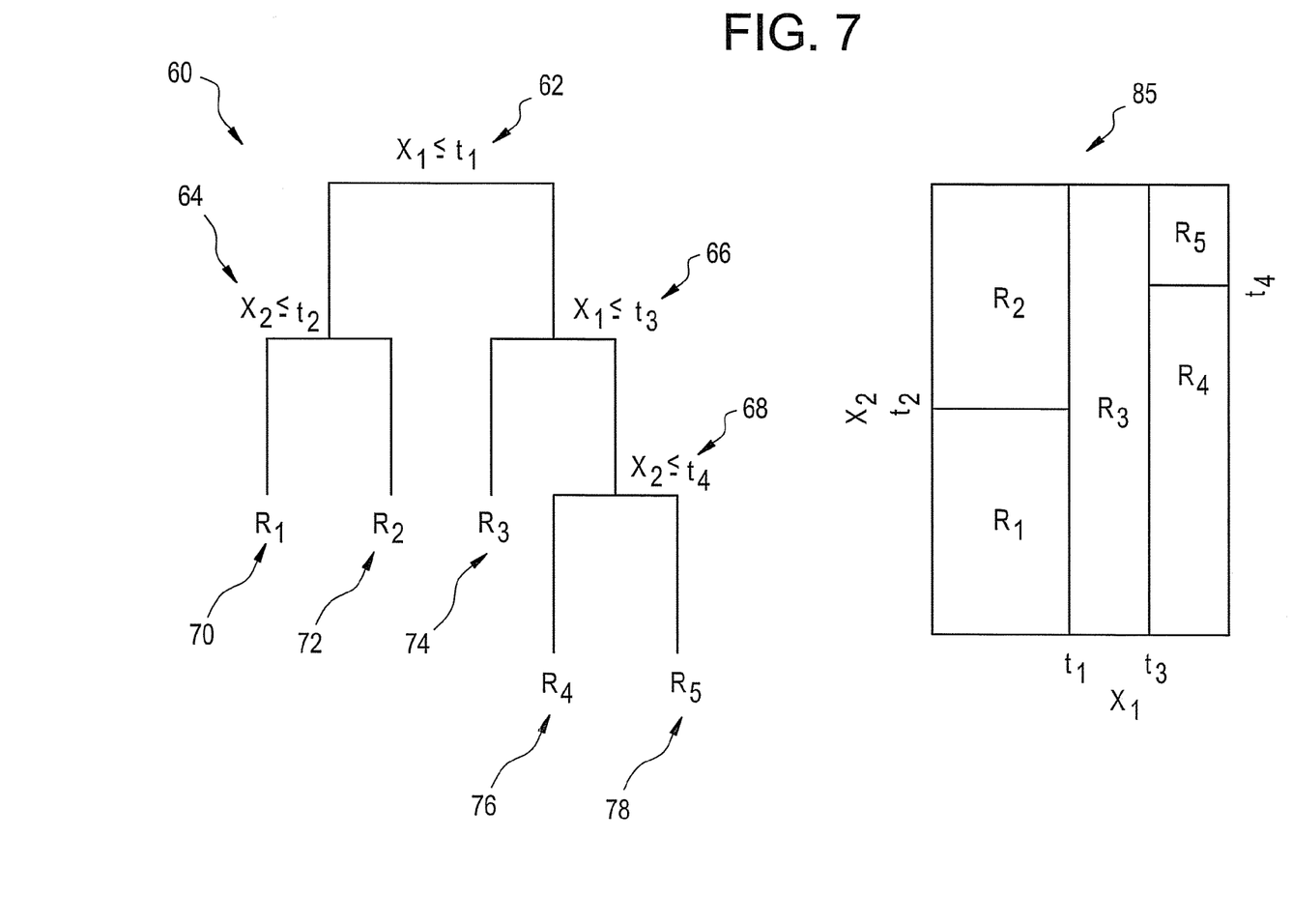
FIG. 7 depicts a decision tree and a grid for determination of a local weight in accordance with embodiments of the invention.

Referring now to FIG. 7, an embodiment of a decision tree 60 and a grid 85 for determination of the local weight for each region is depicted. The decision tree 60 uses inequalities 62, 64, 66, 68 to evaluate and describe an error magnitude related to each region (data set 22 of the historical data 20) as leafs 70, 72, 74, 76 of the decision tree 60. That is, the result of training the model 18 with the data set 22 is compared with a known result using the historical data 20 to determine the error magnitude related to the region associated with the data set 22. The error is then used to determine a set of appropriate weights to be applied to each region, as represented by the leafs 70, 72, 74, 76, 78 for subsequent rapid recall. In an embodiment, the decision tree is a classification and regression tree (CART). In another embodiment using quantitative description, weight determination is provided by use of a grid, such as the grid 85 with intervals to describe each region of the feature space. The appropriate weight can then be applied to each region, represented by the cell, for subsequent rapid recall.

Another embodiment will develop the local weights by a qualitative description, using domain knowledge about the historical data 20 with linguistic expressions to determine appropriate weights for the regions of the feature space for each model 18. In an embodiment using qualitative description, weight determination for each region is provided by use of a fuzzy partition, generated using fuzzy rules, as will be appreciated by one skilled in the art. The appropriate weight can then be applied to each region as described by the fuzzy partition, for subsequent rapid recall.

In another embodiment, the local weights are selected based upon expert knowledge of local performance (as may be defined by accuracy, for example) of each region of the feature space. In an embodiment, the weights for each region are defined by a fuzzy grid, also known as an adaptive neural fuzzy inference system (ANFIS). The appropriate weights for each model 18 are computed by an interpolation of the fuzzy grids. Once a new input point, corresponding to the behavior of the probe 16 is provided, an intersection of its cylindrical extension upon the fuzzy grid will provide the local weight to be assigned to each model 18. The fused output 19 can then be obtained based on these computed local weights In an embodiment, an evolutionary algorithm (EA), such as a genetic algorithm for example, is used to automate region, or partition selection, as will be described further below. It will be appreciated by one skilled in the art that an EA can be used to directly develop and update the appropriate weights without region selection. That is, rather than using the EA to select the regions for which the weights are defined, the EA is used to determine the weights directly and to update the weights as appropriate to changes in the data sets 22. In another embodiment, use of the EA, such as genetic programming for example, is extended from feature (region and weighting) selection to feature construction. That is, the EA is used to automate attribute construction and evolve the attribute space with functional compositions (such as addition, subtraction, multiplication, and division) of primitive attributes (such as temperatures, pressures, speed, altitude, etc) applied to the primitive attributes.

Figure 8:
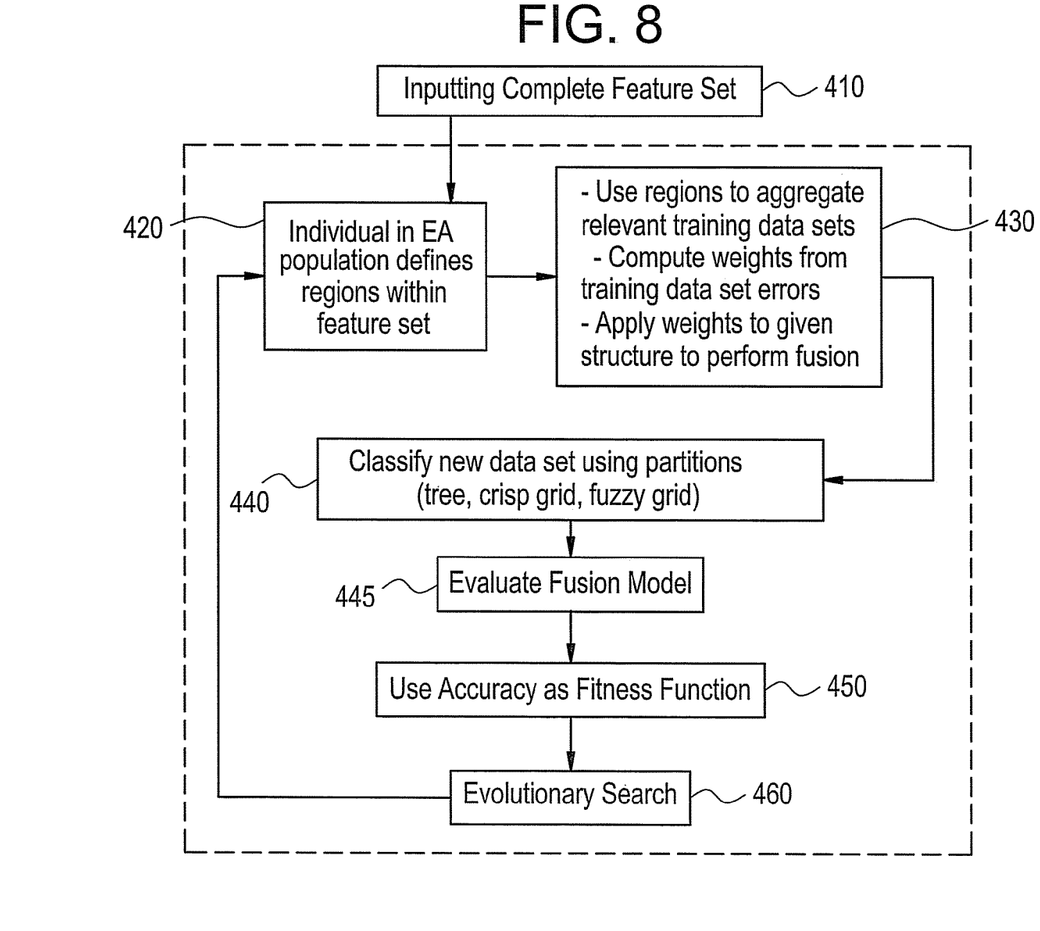
FIG. 8 depicts a flowchart of an evolutionary algorithm in accordance with an embodiment of the invention.

Referring now to FIG. 8, a flowchart 400 of an embodiment of the EA, known as a wrapper approach, for region selection is depicted. In an embodiment, the EA will compare, or test for accuracy, a sample model 18 constructed with a specific region selection to a known result. The EA will then adjust at least one of the regions, retest, and monitor the effect on accuracy. In this way, the EA will search to find the optimum region selection within the historical data 20 to optimize accuracy of the RUL prediction. In an embodiment, the EA begins with inputting at Step 410 the complete feature set of the historical data 20. The process continues with defining at Step 420 an individual data set 22 including the region of feature space within the historical data 20. Next, aggregating at Step 430 relevant training data sets 22 using the regions, computing weights from training data set 22 prediction errors, and applying the computed weights to perform fusion of the model outputs 15. The method proceeds by classifying at Step 440 a new data set 22 using at least one of the foregoing disclosed types of region description. Next, evaluating at Step 445 the fusion model 14 including the new data set 22 classified at Step 440 to derive the fused output 19, such as a predicated RUL for example. Testing, or comparing at Step 450 the fused output 19, with a fitness function $f$, to evaluate an accuracy of the defined region against a known result. Because it is desired to generate the most accurate RUL estimate, the absolute value of the prediction error is used as the function to minimize, that is: $|y-\hat{y}|$. Since the fitness function is to be maximized, the negation of such error is used as the fitness function, that is: $f=-|y-\hat{y}|$. Subsequent to comparing the accuracy of the fused output 19 to the known result, the search continues 460 by defining 420 another individual data set 22 as a subset of historical data 20, and repeating the process.

With reference to FIG. 2, it will be appreciated that the fusion model 14 aggregates, or fuses the model outputs 15 to which appropriate weights, as described above, have been applied. State information 13 available within each model 18 is also provided to the fusion model 14. State information 13 includes a distribution of potential model outputs from which the model 18 determined and selected as most appropriate the model output 15, for example. Such aggregation operators relate to the structure of the fusion model 14. It will be appreciated that many schemes are available to be used by the fusion model 14 to aggregate the model outputs 15. In an embodiment, consensus operators define the fusion of the model outputs 15, to take into account an amount of agreement between diverse model outputs 15. In an embodiment, it will be desired to select a fusion structure including a fusion order that maintains a largest number of solution points subsequent to a partial fusion. This is known as a principle of least commitment. In another embodiment, it will be desired to select a fusion structure including a fusion order that preserves semantics to enable interpretations of the intermediate variables used in the cascading fusions. This is known as interpretation of intermediate variables.

Figure 9:
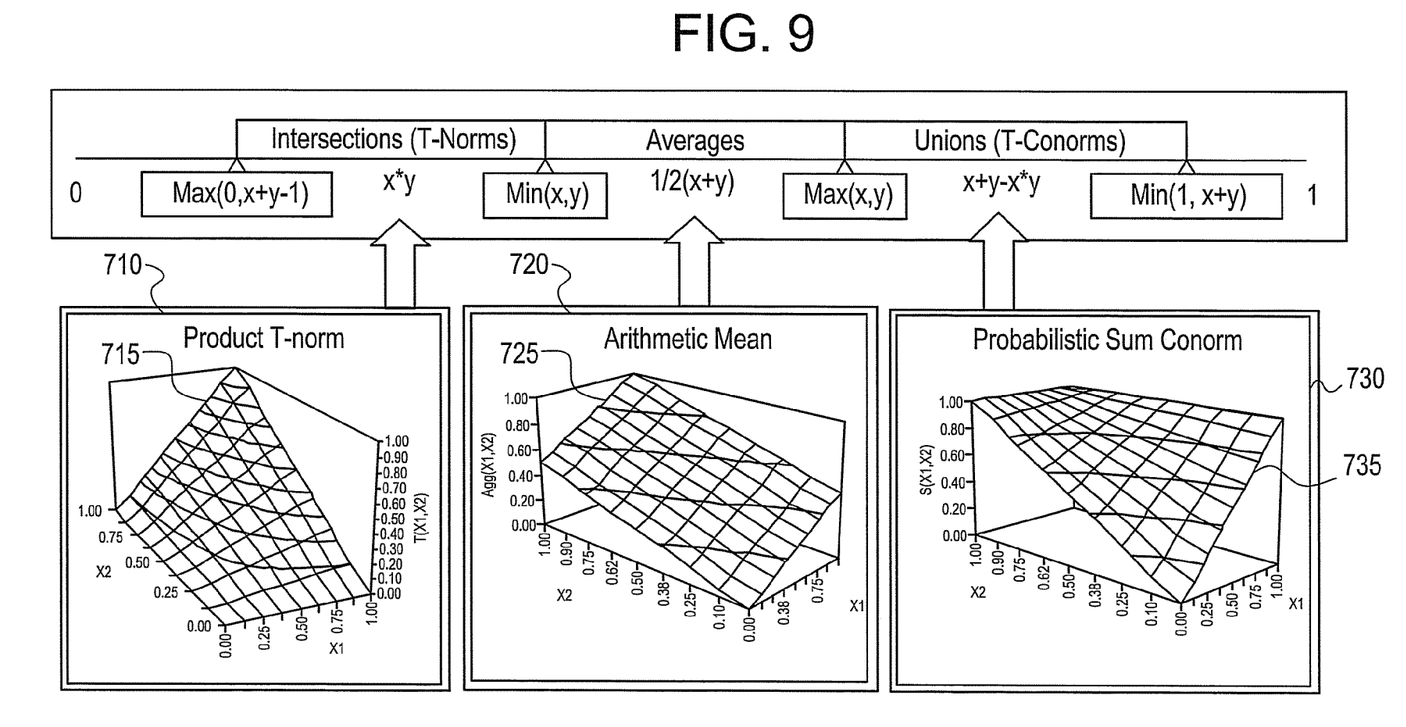
FIG. 9 depicts graphical response surfaces of consensus operators used for model output fusion in accordance with an embodiment of the invention.

Referring now to FIG. 9, graphical response surfaces of different consensus operators used for model output 15 fusion are depicted. In an embodiment, a chart 710 depicts an intersection response surface 715, resulting from a use of an intersection, or T-Norm fusion scheme. The intersection fusion scheme will provide a consensus operator. In an embodiment, the intersection fusion scheme is a Dempster-Shafer aggregation in which all models 18 agree on the fused output 19.

In an embodiment, a chart 720 depicts an average response surface 725, resulting from a use of an averaging fusion scheme. The averaging fusion scheme will provide a compensatory operator. Examples of the averaging fusion scheme, for the purpose of illustration and not limitation, include at least one of arithmetic, harmonic, and geometric weighted averages.

In an embodiment, a chart 730 depicts a union, or T-conorm response surface 735, resulting from a use of a probabilistic sum fusion scheme. The probabilistic sum scheme will provide a cumulative aggregation, or union operator. Examples of the probabilistic sum fusion scheme, for the purpose of illustration and not limitation, include cases in which a decision space is so large that no single model 18 is able to cover it, such as a n-D Pareto Surface, for example.

Time-dependent or temporal operators define the fusion of the model outputs 15, and modify the weights based upon prediction consistency as a function of time. Stated alternatively, embodiments utilize dynamic computation to reduce model deterioration and obsolescence. For example, it will be appreciated that an engine 110 will wear with use, and that as a result of such wear, models 18 trained with more recent data sets 22 may yield RUL estimates with an increased accuracy. In an embodiment, a time-dependent operator defines the fusion of the model outputs 15 to update the weights with a forgetting factor to increase an emphasis on weights that have been developed with data sets 22 that have been more recently updated. In another embodiment, a time dependent operator defines the fusion of the model outputs 15 to update the weights absent a forgetting factor, to provide uniform emphasis to weights without regard to an age of the data set 22 with which the weight was developed. In yet another embodiment, a time dependent operator defines the fusion of the model outputs 15 with a "moving window", which will eliminate altogether consideration of weights developed with a data set 22 that has not been updated subsequent to a specified duration threshold.

In another embodiment, other operators are utilized to define the structure of the fusion model 14. For example, if the fusion model 14 includes fixed partitions, or regions, as defined by at least one of the decision tree, crisp grid, and fuzzy partitions, the structure will be manually maintained. In an alternative embodiment, the fusion model 14 includes the use of the CART to evolve the structure of the decision tree. In another embodiment, a random forest is used for global sampling of m-tuple features for each leaf of the decision tree. In another embodiment, the EA is used to evolve and refine the structure (positions) of the regions of at least one of the crisp grids and the fuzzy grids. In another embodiment, the EA is used to evolve the fusion model 14 aggregation operators.

Figure 10:
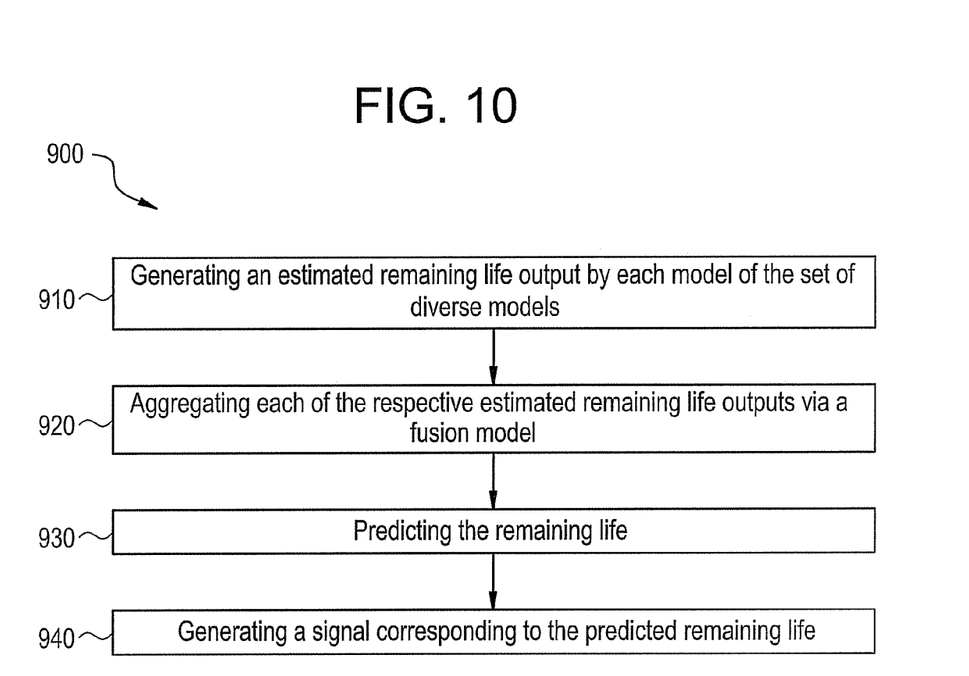
FIG. 10 depicts a flowchart of process steps for predicting a remaining life of a probe in accordance with an embodiment of the invention.

Referring now to FIG. 10, a flowchart 900 of process steps for reducing uncertainty bounds of predicting the remaining life of the probe 16 using the committee 12 of models by a system for generating a RUL prediction, such as the prediction system 10, 100 is depicted.

The process begins by generating at Step 910 the estimated remaining life model output 15 by each model 18 of the committee of models 12, aggregating at Step 920 each of the estimated respective remaining life model outputs 15 via the fusion model 14. In response to the aggregating at Step 920, predicting at Step 930 the remaining life of the probe 16 as the fused output 19. The fused output 19 has reduced uncertainty bounds based on the aggregating as Step 920 as compared to any one of the estimated remaining life model outputs 15. The process concludes at Step 940 with generating a signal corresponding to the fused output 19 predicted remaining life of the probe 16.

In an embodiment, the generating at Step 910 includes making available to each model 18 in the committee of models 12 data relating to a behavior of the probe 16 so that each model 18 generates the respective estimated remaining life model output 15. The aggregating at Step 920 includes making available to the fusion model 14 model input 17 data relating to the behavior of the probe 16 and state information 13 corresponding to each model 18 of the committee of models 12.

In an embodiment, the predicting at Step 930 includes predicting the remaining life of the turbine engine 110. In an embodiment, the process further includes training each model 18 in the committee of models 12 using bootstrap data validation.

In another embodiment, the process further includes defining at least one of the parameter and the structure of the fusion model 14. In yet another embodiment, the defining at least one of the parameter and the structure of the fusion model 14 includes pre-computing at least one of the parameter and the structure of the fusion model 14 prior to the generating at Step 910 the model output 15 of the estimated remaining life.

In an embodiment, the defining the parameter of the fusion model 14 includes the weight corresponding to each respective model output 15 of each respective model 18 of the committee 12. In an embodiment, the defining the parameter includes making available input conditions describing more than one region of the feature space, and defining the local weight corresponding to each of the more than one region of the feature space. In an embodiment, the process further includes describing each region via at least one of the decision tree, the grid, and the fuzzy partition.

In an embodiment, the process includes defining the structure of the fusion model 14 by defining at least one of the intersection fusion operator, the compensatory fusion operator, and the union fusion operator. In an embodiment the process includes defining the structure of the fusion model 14 by defining the temporal operator comprising at least one of the forgetting factor and the moving window.

In an embodiment, the process further includes tuning and maintaining at least one of the parameter and the structure of the fusion model 14 via the optimization wrapper. In an embodiment, the tuning and maintaining include receiving historical data regarding at least one of the parameter and the structure, encoding at least one of the parameter and the structure for an evolutionary algorithm, creating the performance metric for the estimating, and tuning at least one of the parameter and the structure using the optimization wrapper to optimize the performance metric. The tuning and maintaining can also include storing the tuned at least one of the parameter and the structure for subsequent receiving.

Through aggregation and bias compensation, the outputs 15 of the diverse committee of models 12 are fused to generate one output 19. Use of the committee of models 12 facilitates increased RUL prediction performance. By decreasing uncertainty in RUL predictions through use of the committee of models 12 and fusion, selection of equipment maintenance intervals may be extended with higher levels of confidence. In addition, use of the committee of models 12 and fusion facilitates using a reduced amount of historical data as compared to the historical data used to train systems based on just one model 18, which facilitates accelerating system deployment. Use of the fusion model 14 including pre-computed structure and parameters allows reduced processing time required to provide the fused output 19 subsequent to at least one input parameter of the probe 16.

An embodiment of the invention may be embodied in the form of computer-implemented processes and apparatuses for practicing those processes. Embodiments of the present invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. Embodiments of the invention also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to reduce uncertainty bounds of an equipment remaining useful life estimate by aggregating more than one diverse estimate of the equipment remaining useful life.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method to reduce uncertainty bounds of predicting a remaining life of a probe using a plurality of diverse models for predicting the remaining life of the probe, the method comprising:

generating a plurality of estimated remaining life outputs, wherein each of the estimated remaining life outputs is generated using a respective one of the diverse models;

aggregating the estimated remaining life outputs via a fusion model;

in response to the aggregating, predicting the remaining life of the probe, the predicted remaining life having reduced uncertainty bounds based on the aggregating;

generating a signal corresponding to the predicted remaining life of the probe; and defining at least one of a parameter and a structure of the fusion model, wherein the defining step comprises:

defining the parameter of the fusion model, the parameter comprising a weight corresponding to each of the diverse models, wherein the step of defining the parameter comprises:

making available input conditions describing more than one region of a feature space; and defining a local weight corresponding to each of the more than one regions of the feature space.

2. The method of claim 1, wherein the generating an estimated remaining life output comprises:

making available, to each of the diverse models, data relating to a behavior of the probe so that each model generates the respective one of the estimated remaining life outputs.

3. The method of claim 1, wherein the aggregating comprises:

making available to the fusion model data relating to a behavior of the probe; and making available to the fusion model state information corresponding to each of the diverse models.

4. The method of claim 1, wherein the predicting comprises:

predicting the remaining life of a turbine engine.

5. The method of claim 1, further comprising:

training each of the diverse models using bootstrap data validation.

6. The method of claim 1, wherein the defining further comprises:

pre-computing at least one of the parameter and the structure of the fusion model prior to the generating the estimated remaining life output.

7. The method of claim 1, further comprising tuning and maintaining at least one of the parameter and the structure via an optimization wrapper.

8. The method of claim 1, further comprising:
describing a region of the more than one regions via at least one of a decision tree, a grid, and a fuzzy partition.

9. The method of claim 1, wherein the defining the structure of the fusion model comprises:
defining at least one of an intersection fusion operator, a compensatory fusion operator, and a union fusion operator.

10. The method of claim 1, wherein the defining the structure of the fusion model comprises:
defining a temporal operator comprising at least one of a forgetting factor and a moving window.

11. A program storage device readable by a computer, the device embodying a program or instructions executable by the computer to perform the method of claim 1.

12. A method to reduce uncertainty bounds of predicting a remaining life of a probe using a plurality of diverse models for predicting the remaining life of the probe, the method comprising:
generating a plurality of estimated remaining life outputs, wherein each of the estimated remaining life outputs is generated using a respective one of the diverse models;
aggregating the estimated remaining life outputs via a fusion model;
in response to the aggregating, predicting the remaining life of the probe, the predicted remaining life having reduced uncertainty bounds based on the aggregating;
generating a signal corresponding to the predicted remaining life of the probe;
defining at least one of a parameter and a structure of the fusion model; and
tuning and maintaining at least one of the parameter and the structure via an optimization wrapper, wherein the tuning and maintaining comprises:
receiving historical data regarding at least one of the parameter and the structure;
encoding at least one of the parameter and the structure for an evolutionary algorithm;
creating a performance metric for the estimating;
tuning at least one of the parameter and the structure using the optimization wrapper to optimize the performance metric; and
storing the tuned at least one of the parameter and the structure for subsequent receiving.

13. A system to estimate a remaining life of a probe using a plurality of diverse models, the system comprising:
a processor;
a computational model application for executing on the processor, the computational model application performing a method, comprising:
generating a plurality of estimated remaining life outputs, wherein each of the estimated remaining life outputs is generated using a respective one of the diverse models;
aggregating the respective estimated remaining life outputs via a fusion model;
in response to the aggregating, predicting the remaining life of the probe, the predicted remaining life having reduced uncertainty bounds based on the aggregating; and
defining at least one of a parameter and a structure of the fusion model, wherein the defining by the computational model application comprises defining the parameter of the fusion model, the parameter comprising a weight corresponding to each respective one of the diverse models, and wherein the defining the parameter by the computational model application comprises:
making available input conditions describing more than one region of a feature space; and
defining a local weight corresponding to each of the more than one regions of the feature space;
wherein the processor is responsive to the computational model application to generate a signal corresponding to the predicted remaining life of the probe.

14. The system of claim 13, wherein the generating by the computational model application comprises:
making available to each of the diverse models data relating to a behavior of the probe so that each model generates the respective one of the estimated remaining life outputs.

15. The system of claim 13, wherein the aggregating by the computational model application comprises:
making available to the fusion model data relating to a behavior of the probe; and
making available to the fusion model state information corresponding to each of the diverse models.

16. The system of claim 13, wherein:
the probe is a turbine engine.

17. The system of claim 13, wherein the computational model application further performs:
training each of the diverse models using bootstrap data validation.

18. The system of claim 13, wherein the defining further comprises:
pre-computing at least one of the parameter and the structure of the fusion model prior to the generating the estimated remaining life output.

19. The system of claim 13, wherein the computational model application further performs:
tuning and maintaining at least one of the parameter and the structure via an optimization wrapper.

20. The system of claim 13, wherein the computational model application further performs:
describing a region of the more than one regions via at least one of a decision tree, a grid, and a fuzzy partition.

21. The system of claim 13, wherein the defining the structure of the fusion model by the computational model application further comprises:
defining at least one of an intersection fusion operator, a compensatory fusion operator, and a union fusion operator.

22. The system of claim 13, wherein the defining the structure of the fusion model by the computational model application further comprises:
defining a temporal operator comprising at least one of a forgetting factor and a moving window.

* * * * *

UNITED STATES PATENT AND TRADEMARK OFFICE
CERTIFICATE OF CORRECTION

PATENT NO. : 7,548,830 B2
APPLICATION NO. : 11/678273
DATED : June 16, 2009
INVENTOR(S) : Goebel et al.

Page 1 of 1

It is certified that error appears in the above-identified patent and that said Letters Patent is hereby corrected as shown below:

On the Title Page, in Field (75), under "Inventors", in Column 1, Line 5, delete "Schnectady," and insert -- Schenectady, --, therefor.

In Column 1, Line 12, delete "malting" and insert -- making --, therefor.

In Column 2, Lines 61-62, delete "talking" and insert -- taking --, therefor.

Signed and Sealed this

Twenty-second Day of September, 2009

David J. Kappos
*Director of the United States Patent and Trademark Office*